United States Patent
Suzuki et al.

(10) Patent No.: US 7,800,712 B2
(45) Date of Patent: Sep. 21, 2010

(54) COLD CATHODE FLUORESCENT LAMP AND LIQUID CRYSTAL DISPLAY DEVICE

(75) Inventors: Toshio Suzuki, Shirako (JP); Toshifumi Komiya, Mobara (JP); Satoshi Muto, Mobara (JP); Reiji Torai, Chiba (JP)

(73) Assignees: Hitachi Displays, Ltd., Chiba-ken (JP); Hitachi Display Devices, Ltd., Chiba-ken (JP)

( * ) Notice: Subject to any disclaimer, the term of this patent is extended or adjusted under 35 U.S.C. 154(b) by 223 days.

(21) Appl. No.: 12/071,683

(22) Filed: Feb. 25, 2008

(65) Prior Publication Data

US 2008/0204632 A1    Aug. 28, 2008

(30) Foreign Application Priority Data

Feb. 26, 2007  (JP) ............................. 2007-044852

(51) Int. Cl.
    *G02F 1/1333* (2006.01)
(52) U.S. Cl. ......................................... 349/71; 313/486
(58) Field of Classification Search ................ 313/486, 313/495, 576, 607; 349/57, 70, 71
    See application file for complete search history.

(56) References Cited

U.S. PATENT DOCUMENTS

| 6,515,433 | B1 * | 2/2003 | Ge et al. ................. | 315/227 R |
| 2002/0027412 | A1 * | 3/2002 | Yoshida et al. ............. | 313/486 |
| 2005/0017627 | A1 * | 1/2005 | Asai et al. .................... | 313/491 |
| 2005/0057143 | A1 * | 3/2005 | Chow et al. ................. | 313/492 |
| 2007/0138934 | A1 * | 6/2007 | Goto .......................... | 313/491 |
| 2007/0164676 | A1 * | 7/2007 | Kim .......................... | 313/607 |
| 2008/0136312 | A1 * | 6/2008 | Wei et al. .................... | 313/495 |

FOREIGN PATENT DOCUMENTS

CN    1825531 A    4/2006

* cited by examiner

*Primary Examiner*—Akm E Ullah
(74) *Attorney, Agent, or Firm*—Stites & Harbison PLLC; Juan Carlos A. Marquez, Esq.

(57) ABSTRACT

A cold cathode fluorescent lamp includes a tube having an inner surface coated with a fluorescent film and tubular discharge electrodes disposed at both inner ends of the tube. Each discharge electrode has an opening facing a discharge area and includes a projection in the opening, the area of the projection being reduced by electric discharge.

12 Claims, 10 Drawing Sheets

COLD CATHODE FLUORESCENT LAMP AND LIQUID CRYSTAL DISPLAY DEVICE

BACKGROUND OF THE INVENTION

1. Field of the Invention

The present invention relates to a cold cathode fluorescent lamp used as a light source for a liquid crystal display panel and a liquid crystal display device including a backlight using the cold cathode fluorescent lamp. In particular, the present invention relates to the structure of electrodes in the cold cathode fluorescent lamp.

2. Background Art

Among various illuminating devices, discharge tubes are often used as compact extended-lifetime light sources with low power consumption and high luminance. Fluorescent lamps are well-known as low-pressure discharge tubes each comprising a glass tube, whose inner surface is coated with a fluorescent material, filled with an inert gas and mercury. The low-pressure discharge tubes include two types, i.e., a hot cathode type for thermoelectron emission and a cold cathode type for electron emission.

Since liquid crystal display panels are non-self-luminous, each liquid crystal display panel has an external illuminating device. The liquid crystal display panel controls the amount of transmitted illumination light and that of reflected one to display an image. The external illuminating device is disposed on the back or front of the liquid crystal display panel. As for the current mainstream structure of display devices requiring high luminance, an illuminating device is arranged on the back of a liquid crystal display panel. The illuminating device on the back of the liquid crystal display panel is called a "backlight".

Backlights are broadly divided into a side-edge type and a direct-lighting type. A side-edge backlight has a structure in which a linear light source is disposed along one side edge of a light guide plate comprising a transparent plate. Side-edge backlights are generally used in display devices required to be thin for use in personal computers. On the other hand, direct-lighting backlights are generally used in large liquid crystal display devices for use in display monitors and television receivers. Each direct-lighting backlight has a structure in which the backlight (illuminating device) is disposed on the back of a liquid crystal display panel.

For example, an illuminating device for a liquid crystal display device includes, as a light source, a cold cathode fluorescent lamp (CCFL) that emits electrons and excites a fluorescent material using the electrons to emit light. Electrodes for emitting electrons are typically made of a metallic material, such as nickel. Since such electrodes have the sputtering characteristics, the electrodes wear out during operation. When the gas pressure in a glass tube is reduced in order to obtain high luminance, sputtering is accelerated. The acceleration of sputtering makes the electrodes to be easily broken. Unfortunately, shortening of the lifetime of the cold cathode fluorescent lamp becomes pronounced.

To reduce the cost of a liquid crystal display device, it is desirable to reduce the number of cold cathode fluorescent lamps used. To reduce the number of cold cathode fluorescent lamps while the luminance of a backlight is maintained, each cold cathode fluorescent lamp has to have high luminance. However, when the gas pressure is reduced in order to obtain high luminance, the lifetime of each cold cathode fluorescent lamp is shortened.

To increase the lifetime of the cold cathode fluorescent lamp while high luminance is realized by reducing the gas pressure, it is desirable to use electrodes having a low sputtering rate. So long as the sputtering rate is low, even when fast particles collide with the electrodes, the rate of atom emission is low. Such a technique is disclosed in, for example, JP-A-2004-178875.

SUMMARY OF THE INVENTION

Achieving high luminance in a liquid crystal display device requires, for example, a reduction in gas pressure in a glass tube and an increase in operating current. Disadvantageously, the reduction in gas pressure and the increase in operating current lead to a reduction in lifetime of a cold cathode fluorescent lamp. Under these circumstances, it is necessary to develop a new electrode resistant to high current while both of the high luminance of the cold cathode fluorescent lamp and the increase in the lifetime of this lamp are achieved.

One of methods of achieving high luminance using related-art nickel electrodes is to reduce the pressure of an enclosed gas. To reduce the pressure of the enclosed gas, however, the high luminance can be achieved but sputtering on the electrodes is accelerated, resulting in a reduction in lifetime of the electrode.

Specifically, when the gas pressure in a sealed glass tube is reduced, the amount of gas molecules in the glass tube decreases. Accordingly, the amount of unionized gas molecules that block ionized gas molecules also decreases. The decrease of the amount of blocking gas molecules increases the speed and rate of collision of ionized gas molecules against the electrodes, thus accelerating sputtering.

To realize the long lifetime while the high luminance is achieved by reducing the pressure of the enclosed gas, electrodes having a low sputtering rate are desirably used. As for materials for the electrodes having a low sputtering rate, tungsten is preferably used because it has a high hardness and a high melting point. However, it is difficult to make an electrode using tungsten in terms of its characteristics, i.e., the high hardness and the high melting point.

The present invention is made to overcome the above-described disadvantages. An object of the present invention is to provide a cold cathode fluorescent lamp capable of maintaining stable discharge for a long time even when sputtering is accelerated, and a liquid crystal display device including the cold cathode fluorescent lamp as a light source.

To accomplish the above-described object, according to an embodiment of the present invention, a cold cathode fluorescent lamp includes a tube having an inner surface coated with a fluorescent film, and tubular discharge electrodes disposed at both inner ends of the tube. Each discharge electrode has an opening facing a discharge area and includes a projection in the opening, the area of the projection being reduced by electric discharge.

According to another embodiment of the present invention, a liquid crystal display device includes a liquid crystal display panel including two transparent substrates having electrodes for pixel formation and a liquid crystal layer sandwiched between the substrates, and a backlight including at least one cold cathode fluorescent lamp that applies illumination light to the back of the liquid crystal display panel. The cold cathode fluorescent lamp includes a tube having an inner surface coated with a fluorescent layer, and tubular discharge electrodes disposed at both inner ends of the tube. Each discharge electrode has an opening facing a discharge area and includes a projection in the opening, the area of the projection being reduced by electric discharge.

The cold cathode fluorescent lamp according to the foregoing embodiment has the following excellent advantages: Arranging the projection in each cup electrode increases the area of the inner surface of the electrode, thus reducing the current density in the electrode. Since the projection is sputtered before the inner surface of the electrode, thus increasing the lifetime of the cold cathode fluorescent lamp.

A liquid crystal display device using the cold cathode fluorescent lamp according to the foregoing embodiment as a light source of an illuminating device has excellent advantages in that high quality images can be guaranteed for a long time.

DETAILED DESCRIPTION OF THE EMBODIMENTS

An embodiment of the present invention will be described in detail below with reference to the drawings.

According to an embodiment of the present invention, a cold cathode fluorescent lamp includes a tube having an inner surface coated with a fluorescent material and tubular discharge electrodes disposed at both inner ends of the tube. Each discharge electrode has an opening facing a discharge area and includes a projection in the opening, the area of the projection being reduced by electric discharge.

According to another embodiment of the present invention, a liquid crystal display device includes a liquid crystal display panel including two transparent substrates having electrodes for pixel formation and a liquid crystal layer sandwiched between the substrates such that the electrodes face the liquid crystal layer, and a backlight including at least one cold cathode fluorescent lamp that applies illumination light to the back of the liquid crystal display panel. The cold cathode fluorescent lamp includes a tube having an inner surface coated with a fluorescent material, and tubular discharge electrodes disposed at both inner ends of the tube. Each discharge electrode has an opening facing a discharge area and includes a projection in the opening, the area of the projection being reduced by electric discharge.

First Embodiment

Figure 1:
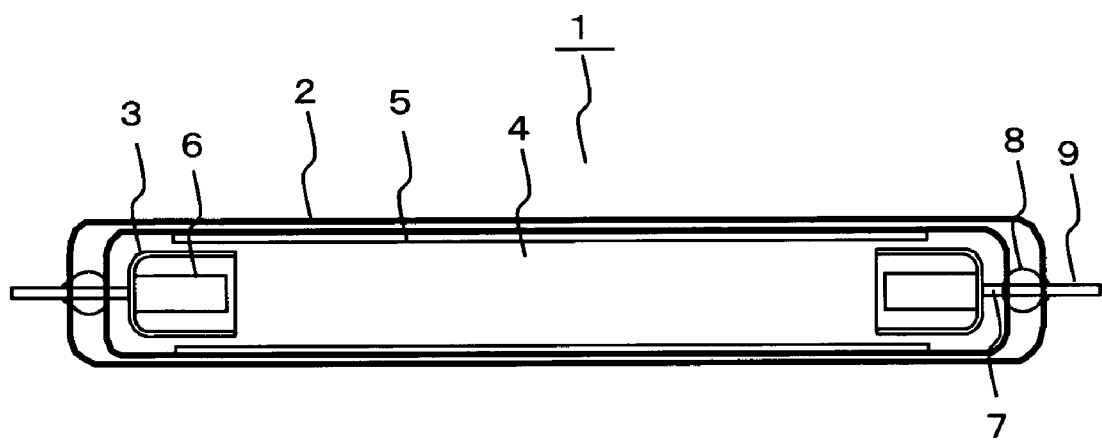
FIG. 1 is a schematic sectional view of a cold cathode fluorescent lamp according to a first embodiment of the present invention.

FIG. 1 is a schematic sectional view of a cold cathode fluorescent lamp 1 according to a first embodiment of the present invention.

The cold cathode fluorescent lamp 1 includes a glass tube 2 made of a light-transmissive insulating material and a pair of cup-shaped electrodes. (hereinafter, cup electrodes) 3 disposed at both inner ends of the glass tube 2 such that the cup electrodes 3 face each other. The open ends of the cup electrodes 3 face a main discharge area. After being evacuated, the glass tube 2 is filled with an inert gas 4, e.g., a Neon-Argon (Ne—Ar) gas mixture, and mercury. The inner surface of the glass tube 2 is coated with a fluorescent material 5. The cup electrodes 3 can be made of a material mainly comprising, for example, tungsten (W).

Each cup electrode 3 has a columnar projection 6 that is made of the same material as that of a cup portion of the cup electrode 3 and is integrated with the cup portion. The projection 6 in the cup portion is easier to be sputtered than the inner surface of the cup portion. Accordingly, the projection 6 is sputtered and worn out before the inner surface of the cup portion. Therefore, the occurrence of a problem caused by wearing out the inner surface of the cup portion can be further delayed than the related art. Advantageously, the lifetime of the cold cathode fluorescent lamp 1 can be increased.

Figure 2A:
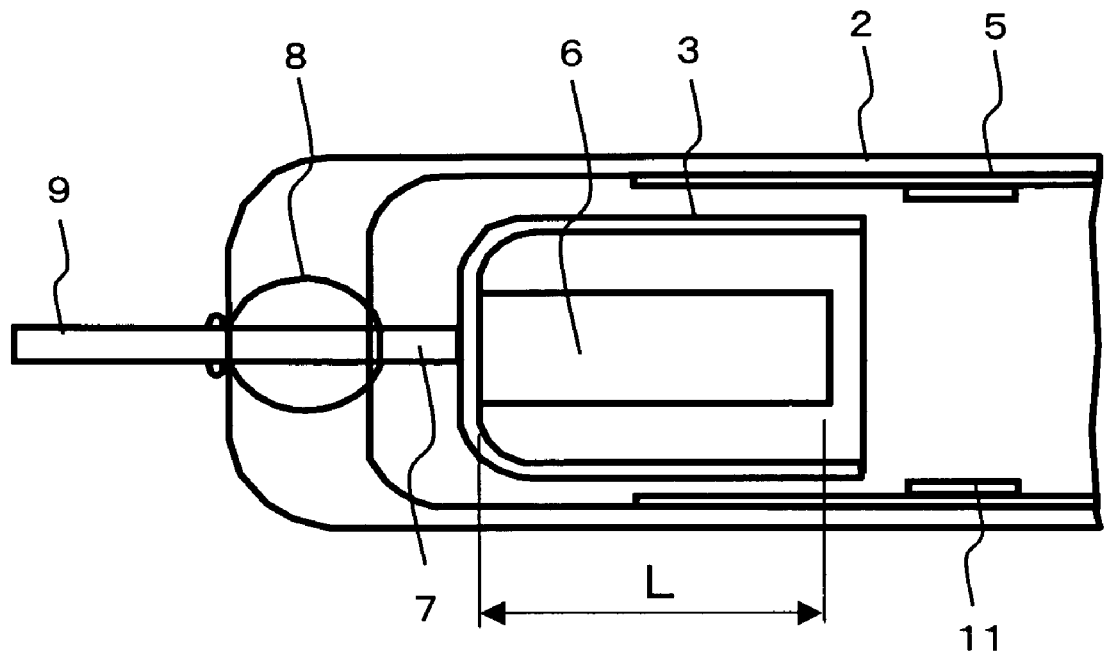
FIGS. 2A and 2B are enlarged views of essential parts of the cold cathode fluorescent lamp according to the first embodiment.
Figure 2B:
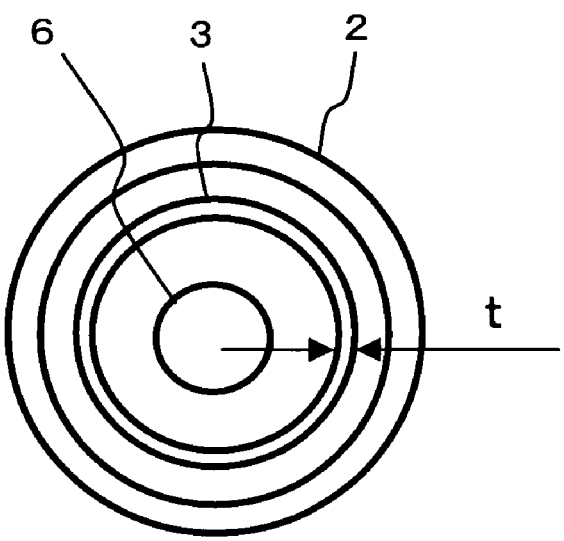

The cup electrodes 3 will now be described in detail with reference to FIGS. 2A and 2B. FIG. 2A is a schematic sectional view of the cup electrode 3 taken along the lengthwise direction of the glass tube 2. FIG. 2B is a schematic cross-sectional view of the cup electrode 3 taken along the direction orthogonal to the lengthwise direction of the glass tube 2.

The open end of the cup electrode 3 faces the main discharge area. An inner lead 7 is welded to the back end of the cup electrode 3 such that the inner lead 7 is aligned to a welded portion of the cup electrode 3. The inner lead 7 comprises a nickel-cobalt-iron alloy having a characteristic similar to the coefficient of thermal expansion of glass. As for welding, for example, a resistance welding process, an arc welding process, or a laser welding process is used. The inner lead 7 is electrically connected to the cup-electrode 3 by welding.

The thickness of the glass tube 2 included in the cold cathode fluorescent lamp 1 ranges, for example, from 200 to 500 μm. The outer diameter of the glass tube 2 ranges from 1.0 to 4.0 mm and the length thereof ranges from 50 to 1500 mm.

When the outer diameter of each cup electrode 3 is 1.7 mm, preferably, the thickness t of the cup electrode 3 is approximately 0.15 mm. The thinner the thickness t of the cup electrode 3, the larger the inner area of the cup electrode 3. Therefore, the amount of the material for the cup electrode 3 is reduced. Preferably, the length L of the projection 6 is 50 percent or longer of the length of the cup electrode 3 because the projection 6 is sputtered before the inner surface of the cup portion. In this embodiment, since the length of the cup portion is 5.0 mm, the length L of the projection 6 ranges from 2.5 to 5.0 mm. The outer diameter of the projection 6 ranges 0.4 to 1.0 mm.

The inner lead 7, supported by a glass bead 8, closes the glass tube 2 through the glass bead 8 in tight contact with the glass tube 2. The glass bead 8 hermetically closes the glass tube 2. Two glass beads 8 are welded to both the ends of the glass tube 2, respectively, so that the glass tube 2 is sealed with the glass beads 8. The inner lead 7 extending from each glass bead 8 is aligned to an outer lead 9 made of, for example, nickel and is joined to the outer lead 9 by welding. The outer lead 9 is connected to a power supply circuit (not shown), typically, an inverter lighting circuit. Accordingly, lighting power is supplied to the facing cup electrodes 3 through the respective outer leads 9.

In addition, an induction film 11 for inducing discharge between the cup electrodes 3 is disposed on part of the fluorescent material coating the inner surface of the glass tube 2 such that the induction film is between the open ends of the cup electrodes 3. The induction film 11 is made of, for example, indium tin oxide (ITO). The ITO film is transparent conductive film. Hereinafter the induction film 11 is called ITO film 11. The ITO film 11 is arranged so as to have a width of approximately 3 mm. As for formation of the ITO film 11, the glass tube 2 is dipped into an ITO slurry such that ITO deposits on the glass tube 2. After dipping the glass tube 2, the ITO film 11 is subjected heat treatment, so that the ITO film 11 is hardened. The ITO film 11 has a thickness of approximately 2 μm thinner than that of the fluorescent film.

The ITO film 11 receives cosmic rays in the atmosphere through the light-transmissive glass tube 2 and the fluorescent film 5. The cosmic rays cause motion of free electrons in the cold cathode fluorescent lamp 1. Simultaneously, applying a voltage between the two cup electrodes 3 induces electron emission from the ITO film 11. The induced electrons emitted from the ITO film 11 promptly start electric discharge together with electrons generated from the cup electrodes 3.

The cold cathode fluorescent lamp 1 with the above-described structure is effectively used on condition that the gas pressure in the glass tube 2 is set to a low value ranging from approximately 70 torr to approximately 40 torr. On the low gas pressure condition, since the projection 6 is arranged in the opening of each cup electrode 3, the surface area of the inner surface of each cup electrode 3 can be increased. Increasing the surface area of the inner surface of each cup electrode 3 can reduce the current density in the electrode. Advantageously, the occurrence of sputtering can be distributed and be suppressed.

Furthermore, the projection 6 arranged in the opening of each cup electrode 3 takes countermeasures against sputtering generated in the cup electrode 3. Since the projection 6 is arranged in the opening, even if sputtering occurs, the projection 6 is worn out, so that the possibility of wearing out the inner surface of the cup portion of the cup electrode 3 can be reduced. Although the projection 6 is worn out by sputtering and the surface area of the inner surface of the cup electrode 3 is reduced, the lifetime of the cold cathode fluorescent lamp 1 is increased because the inner surface of the cup portion of each cup electrode 3 is damaged after the projection 6 is worn out.

Figure 3:
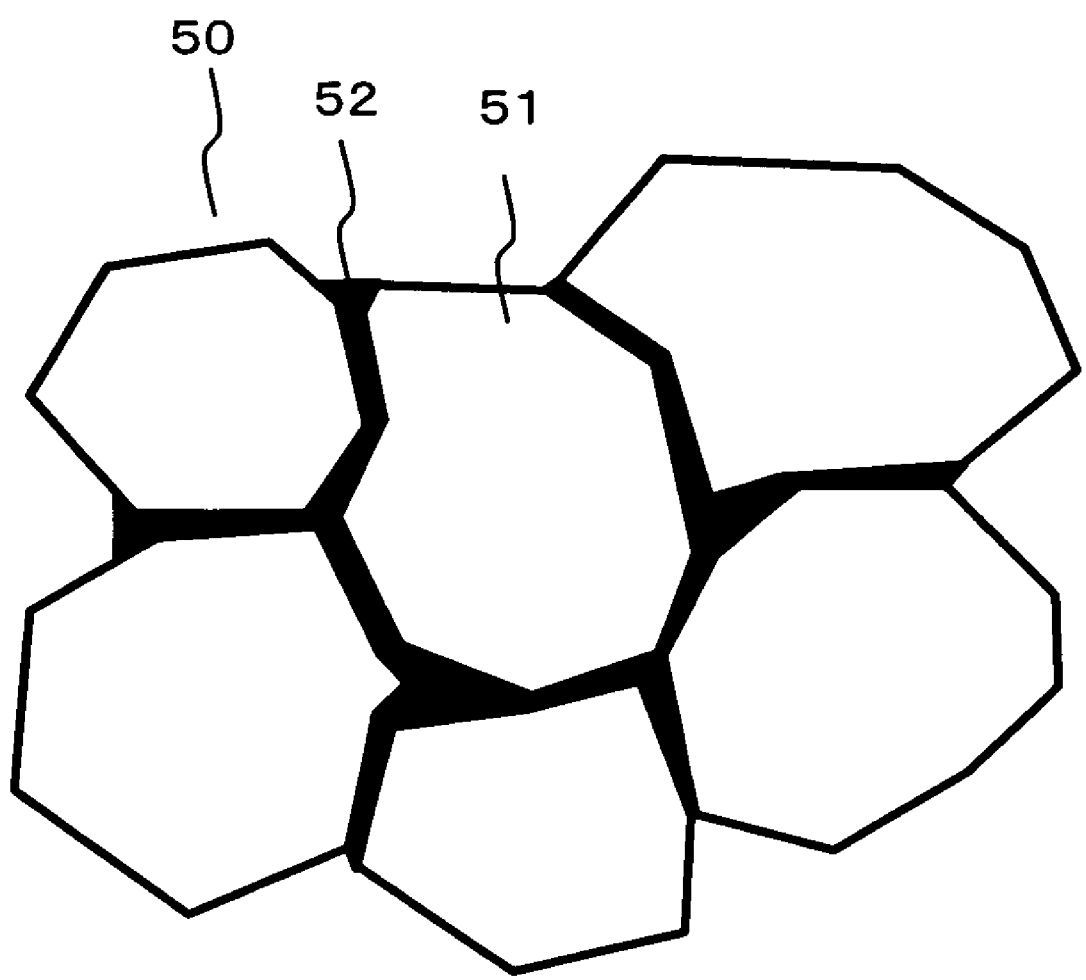
FIG. 3 is an enlarged view of the surface of a material constituting an electrode of the cold cathode fluorescent lamp according to an embodiment of the invention.

The cup electrodes 3 can be prepared by mixing a material having a high melting point with another material having a low melting point and sintering the mixture. FIG. 3 is a schematic enlarged view of a sintered material 50. Referring to FIG. 3, the surface of tungsten (W), serving as a high melting point substance 51, is covered with a monolayer (having a thickness corresponding to a single atom or several atoms) of nickel (Ni), serving as a low melting point substance 52.

In FIG. 3, tungsten particles have a size of 10 to 20 μm. The content of tungsten in the material 50 is 97 to 99 percent by mass and that of nickel in the material 50 is 1 to 3 percent by mass. Although tungsten readily oxidizes, the surfaces of the tungsten particles are thinly coated with nickel, so that the tungsten particles can be prevented from oxidizing.

Furthermore, when each cup electrode 3 is welded to the inner lead 7, the low melting point substance is melted before the high melting point substance. Advantageously, the cup electrode 3 mainly comprising the high melting point substance tends to be easily welded. In addition, even when a temperature sharply increases during welding, the low melting point substance functions as a cushion for the high melting point substance which is hard and brittle, thus suppressing the break of the cup electrode 3. When the inner lead 7 is made of a material containing nickel, nickel is preferably used as the low melting point substance because the welding process can be more easily performed.

Figure 4:
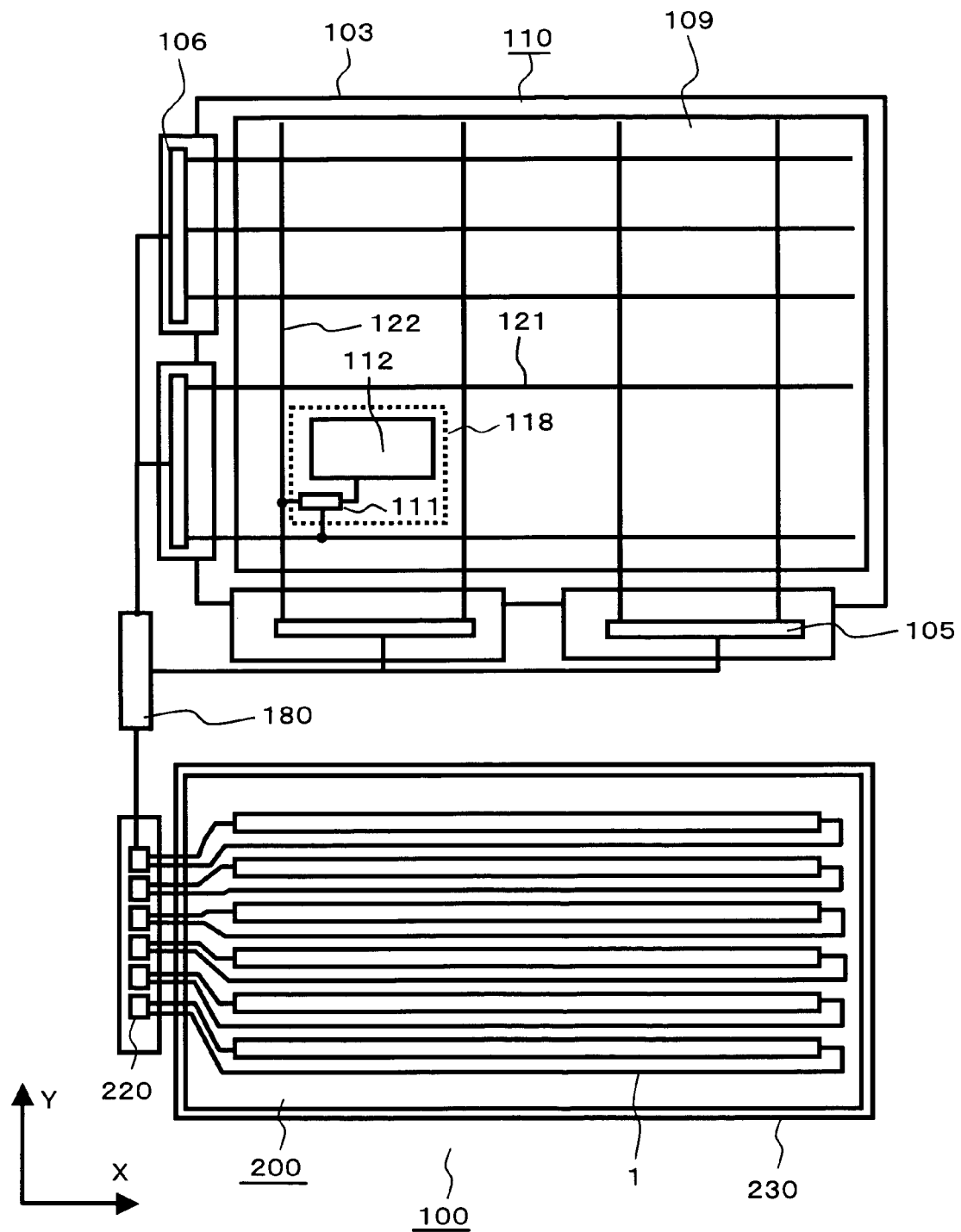
FIG. 4 is a schematic block diagram illustrating the structure of a liquid crystal display device according to an embodiment of the present invention.

FIG. 4 is a plan view of a liquid crystal display device 100 according to an embodiment of the present invention. The liquid crystal display device 100 includes a liquid crystal display panel 110, a control circuit 180, and a backlight 200. The control circuit 180 supplies a signal necessary for display of the liquid crystal display panel 110. The backlight 200, disposed on the back or front of the liquid crystal display panel 110, applies light to the liquid crystal display panel 110.

Since the liquid crystal display panel 110 is not self-luminous, the liquid crystal display panel 110 needs the backlight 200, serving as a light source. As described above, the backlight 200 is arranged behind the liquid crystal display panel 110 relative to a viewer. For the sake of easy understanding, the liquid crystal display panel 110 and the backlight 200 are in line with each other in FIG. 4.

The liquid crystal display panel 110 includes many pixel portions 118 arranged in a matrix. For the sake of easy understanding, one pixel portion 108 is shown in FIG. 4. The pixel portions 108 arranged in a matrix constitute a display area 109. The pixel portions 118 serve as respective pixels of an image to display an image in the display area 109.

Referring to FIG. 4, gate signal lines (also called scanning lines) 121 extending in the X direction in FIG. 4 are arranged in the Y direction. Drain signal lines (also called video signal lines) 122 extending in the Y direction are disposed in the X direction. Each pixel portion 118 is arranged in an area surrounded by the gate signal lines 121 and the drain signal lines 122.

Each pixel portion 118 has a switching element 111. The pixel portion 118 is supplied with a control signal from the corresponding gate signal line 121, thus turning on or off the switching element 111. When the switching element 111 is turned on, a video signal transmitted through the corresponding drain signal line 122 is supplied to a pixel electrode 112 in the pixel portion 118.2

Each gate signal line 121 is connected to a drive circuit 106. Each drain signal line 122 is connected to a drive circuit 105. Each drive circuit 106 outputs a control signal. Each drive circuit 105 outputs a video signal.

The drive circuits 105 and 106 are connected to the control circuit 180 via signal lines and are controlled by the control circuit 180. The control circuit 180 is connected to the backlight 200 via a signal line.

The backlight 200 is supplied with a control signal and a power supply voltage from the control circuit 180, so that the cold cathode fluorescent lamps 1 are turned on. Each cold cathode fluorescent lamp 1 is connected to an inverter circuit 220. Each inverter circuit 220 generates a voltage for turning on the corresponding cold cathode fluorescent lamp 1 and supplies the voltage to the cold cathode fluorescent lamp 1. The cold cathode fluorescent lamps 1 are arranged in a backlight casing 230.

Figure 5:
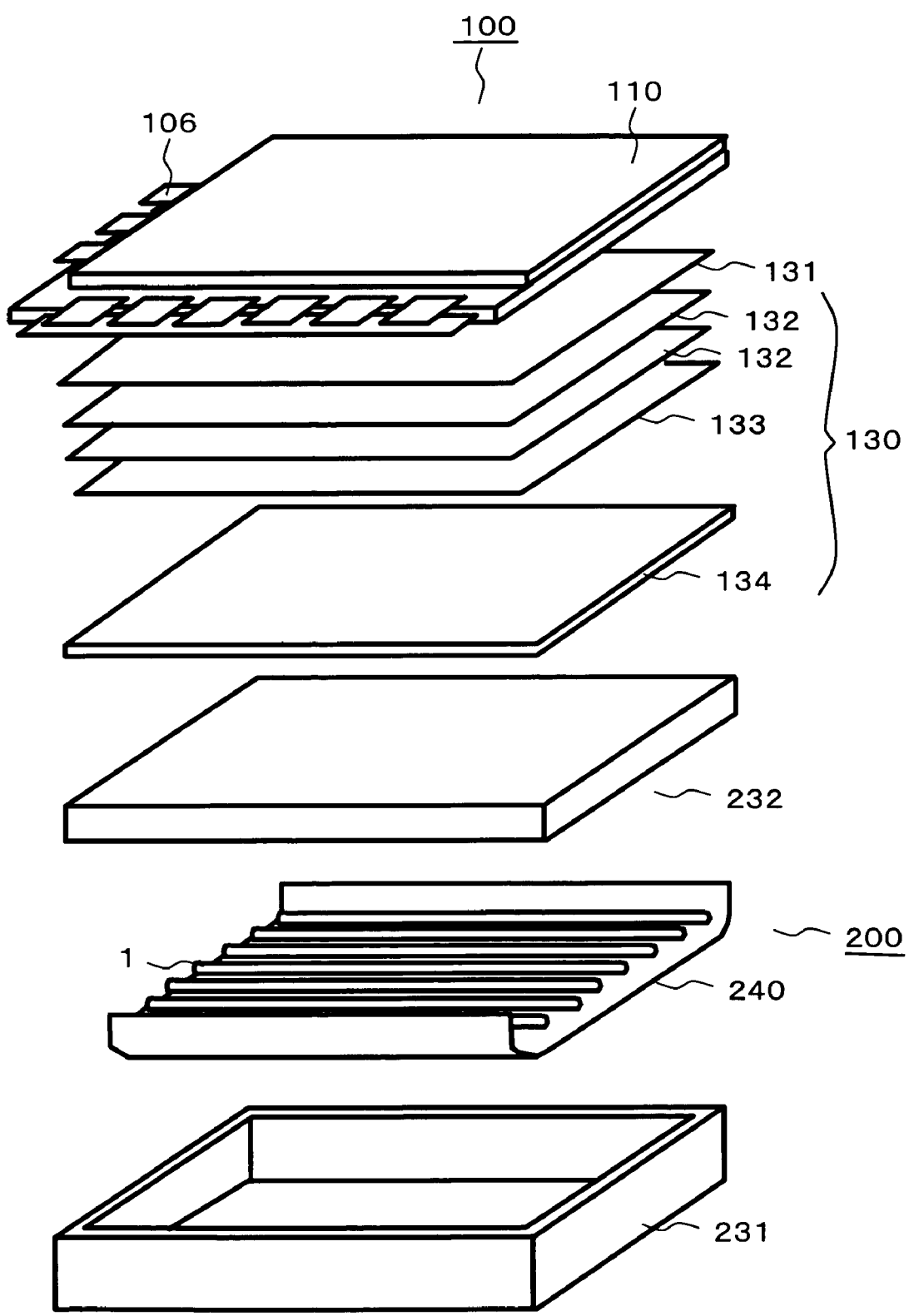
FIG. 5 is an exploded perspective view of the liquid crystal display device including a backlight and schematically shows the structure of the liquid crystal display device.

FIG. 5 is an exploded perspective view of the liquid crystal display device 100 including the backlight 200 and schematically explains the structure of the liquid crystal display device 100.

Referring to FIG. 5, the liquid crystal display panel 110 includes two glass substrates having electrodes for pixel formation and a liquid crystal layer enclosed between the two substrates. Two ends of one glass substrate extend relative to the corresponding two ends of the other substrate. The drive circuits 106 are mounted on the extending ends.

In the liquid crystal display device 100, the inner surface of a lower frame 231 is covered with a reflecting sheet 240 and the cold cathode fluorescent lamps 1 are arranged in parallel to one another above the reflecting sheet 240, thus forming the backlight 200. The lower frame 231 includes a metal plate. The lower frame 231 is attachable to an upper frame (not shown) comprising a metal plate so as to accommodate the liquid crystal display panel 110 and an optical compensating films 130 underlying the panel.

The liquid crystal display device 100 further includes a light guide plate 232, comprising a light-transmissive resin, above the backlight 200. The liquid crystal display device 100 further includes a plurality of kinds of optical compensating sheets above the light guide plate 232 (specifically, between the light guide plate 232 and the liquid crystal display panel 110). The optical compensating films 130 includes a diffusion plate 134, a first diffusion sheet 133, two prism sheets 132 having patterns perpendicular to each other, and a second diffusion sheet 131.

Second Embodiment

Figure 6A:
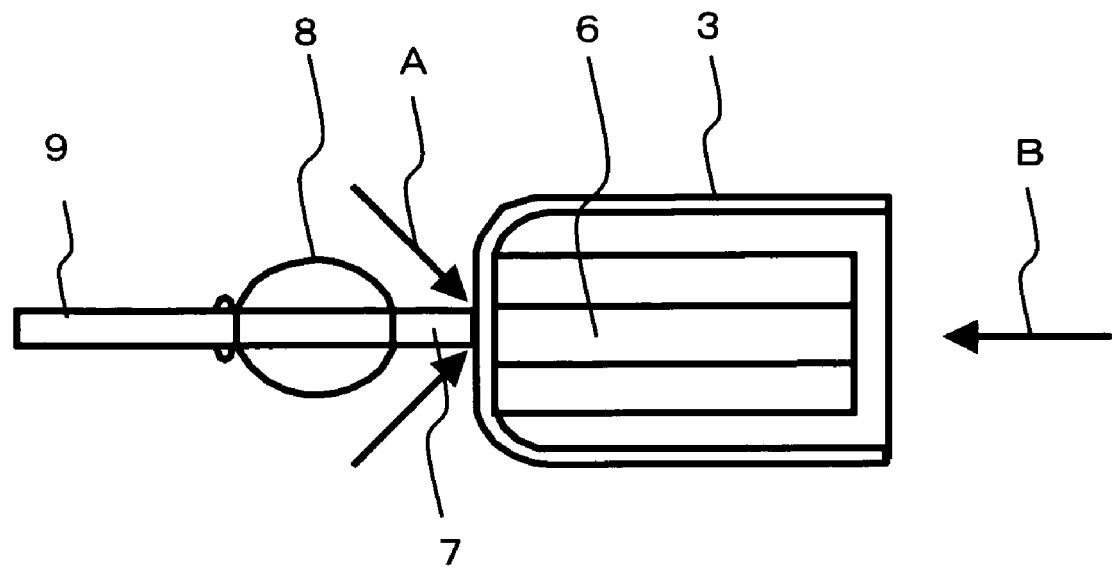
FIGS. 6A and 6B are enlarged views of essential parts of a cold cathode fluorescent lamp according to a second embodiment of the present invention.
Figure 6B:
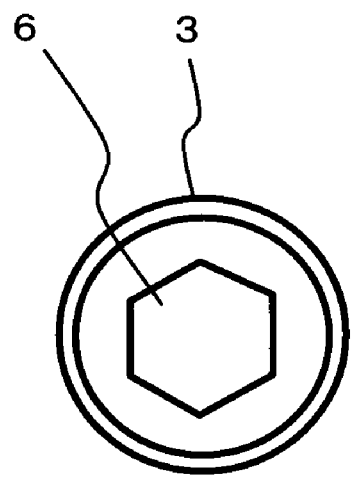

FIGS. 6A and 6B illustrate a projection 6 having a hexagonal cross section. When the projection 6 has a polygonal shape in cross section, the surface area of the projection 6 is larger than that of the projection 6 having a circular shape in cross section. Accordingly, the inner surface area of each cup portion is further increased. Advantageously, the current density in the cup portion can be further reduced. Since the area to be worn out by sputtering is increased, it is effective in further increasing the lifetime.

In the case where the projection 6 has a polygonal cross section as shown in FIGS. 6A and 6B or has a columnar cross section as shown in FIGS. 2A and 2B, a laser beam is applied in the directions indicated by arrows A in FIG. 6A in order to weld an inner lead 7 to the cup electrode 3.

In related art, a laser beam is applied in the direction indicated by arrow B in FIG. 6A. However, it is impossible to apply a laser beam to the inner bottom of a cup electrode 3 and the inner lead 7 because the projection 6 is present. Accordingly, a laser beam is applied as shown by arrows A.

Prior to welding of the inner lead 7 to the cup electrode 3, an outer lead 9, a glass bead 8, and the inner lead 7 are welded, thus preparing a lead-in assembly. The lead-in assembly is then leaser-welded to the cup electrode 3.

Third Embodiment

Figure 7A:
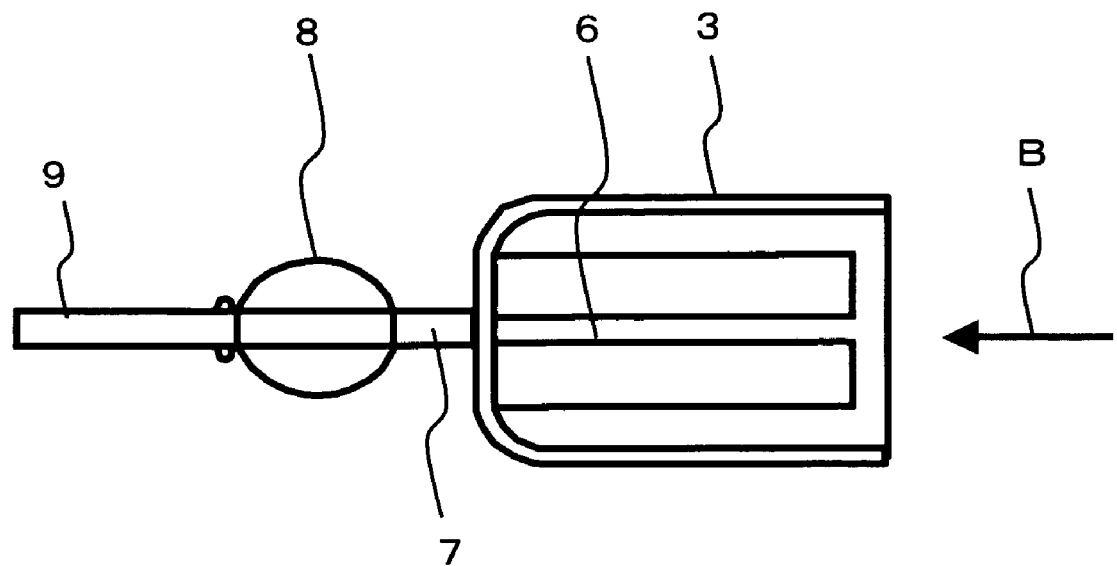
FIGS. 7A and 7B are enlarged views of essential parts of a cold cathode fluorescent lamp according to a third embodiment of the present invention.
Figure 7B:
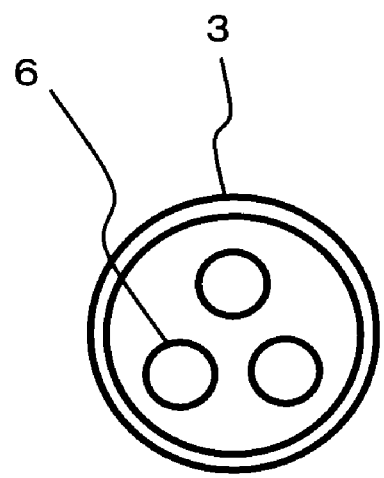

FIGS. 7A and 7B illustrate a cup electrode 3 having a plurality of projections 6. Increasing the number of projections 6 further increases the area of the inner surface of the cup portion. Advantageously, the current density in the cup portion can be reduced.

Referring to FIGS. 7A and 7B, the projections 6 do not overlap the center of the inner surface of the cup portion, so that the inner bottom (or the center) of the cup portion is not hidden by the projections 6. Advantageously, an inner lead 7 can be welded to the cup electrode 3 in the direction indicated by arrow B in FIG. 7A, thus improving the mass productivity of the cup electrodes 3.

Fourth Embodiment

Figure 8A:
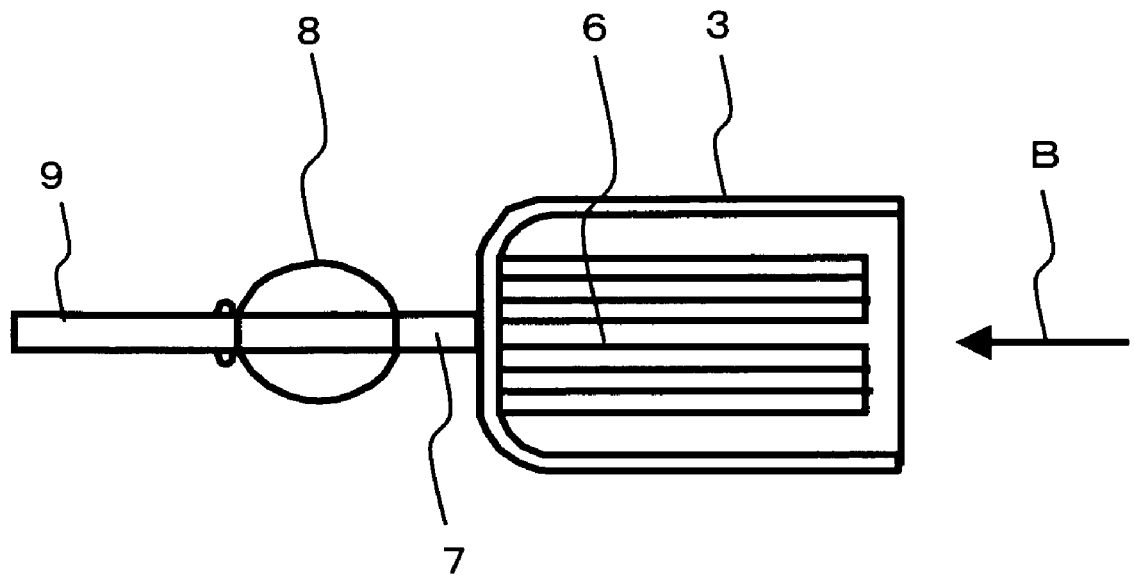
FIGS. 8A and 8B are enlarged views of essential parts of a cold cathode fluorescent lamp according to a fourth embodiment of the present invention.
Figure 8B:
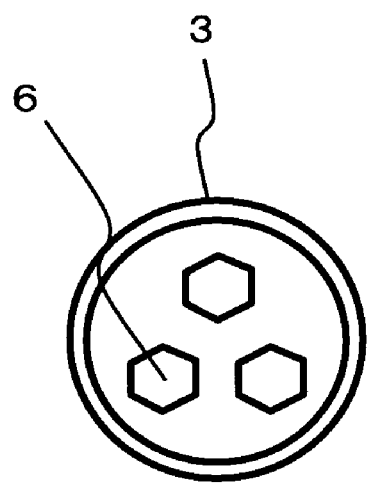

FIGS. 8A and 8B illustrate a cup electrode 3 including a plurality of projections 6 having a polygonal cross section. Since the number of projections 6 is increased and each projection 6 has a polygonal cross section, the area of the inner surface of the cup portion further increases. Advantageously, the current density in the cup portion can be reduced.

Furthermore, referring to FIGS. 8A and 8B, the projections 6 do not overlap the center of the inner surface of the cup portion and a bottom area for laser welding is provided. Advantageously, an inner lead 7 can be welded to the cup electrode 3 in the direction indicated by arrow B in FIG. 8A, thus improving the mass productivity of the cup electrodes 3.

Fifth Embodiment

Figure 9A:
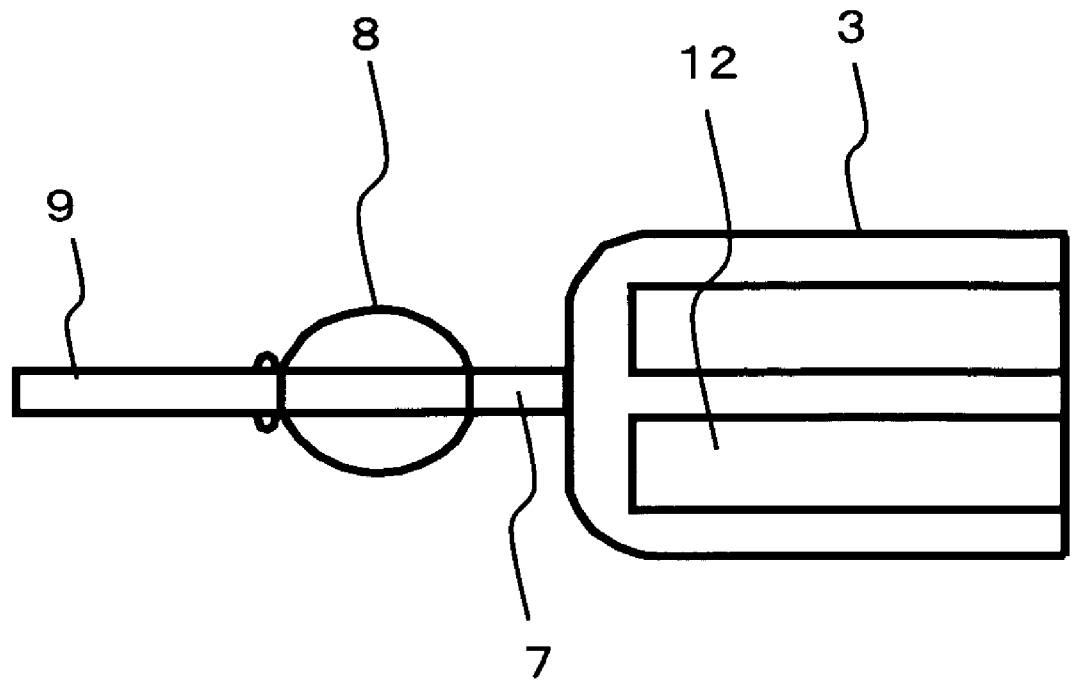
FIGS. 9A and 9B are enlarged views of essential parts of a cold cathode fluorescent lamp according to a fifth embodiment of the present invention.
Figure 9B:
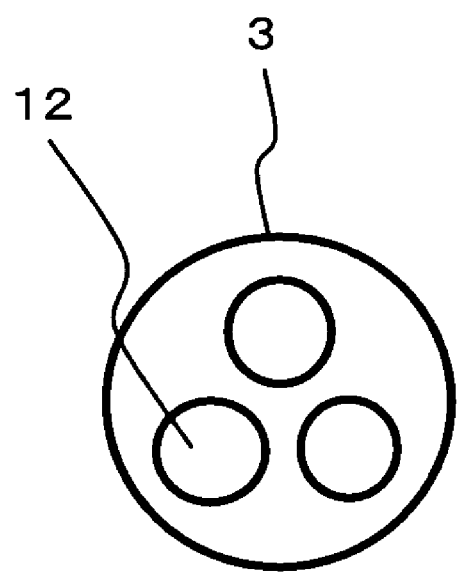

FIGS. 9A and 9B illustrate a cup electrode 3 having a plurality of holes 12. Arranging the holes 12 can increase the inner area of the cup electrode 3. When the outer diameter of the cup electrode 3 is 1.7 mm, the inner diameter of each hole 12 may range from 0.4 to 1.3 mm. When the length of the cup electrode 3 is 5.0 mm, the depth of each hole 12 may be up to approximately 4.8 mm.

Sixth Embodiment

Figure 10A:
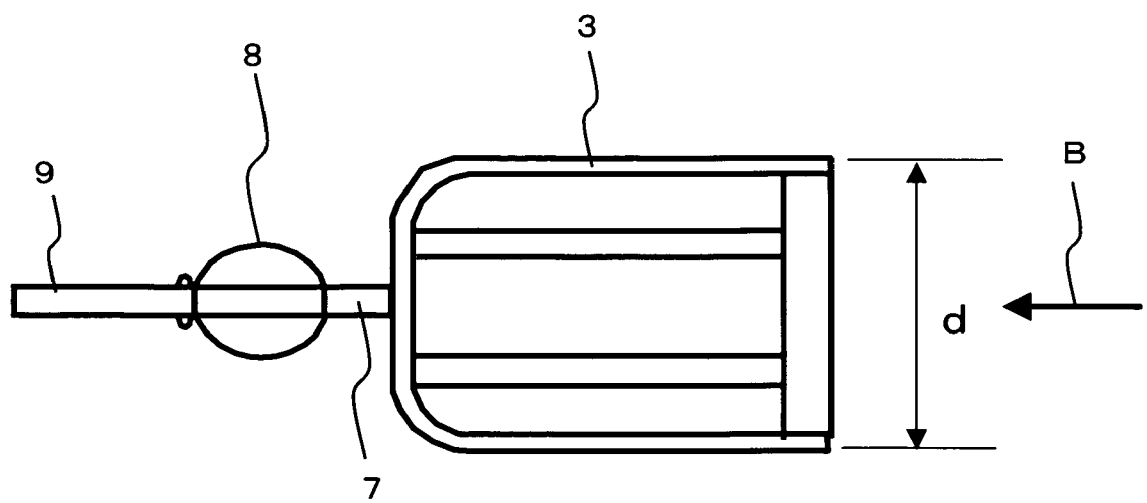
FIGS. 10A and 10B are enlarged views of essential parts of a cold cathode fluorescent lamp according to a sixth embodiment of the present invention.
Figure 10B:
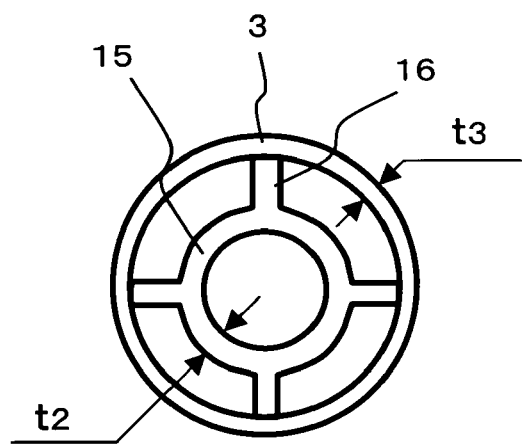

FIGS. 10A and 10B illustrate a cup electrode 3 having a double structure. The cup electrode 3 receives an inner electrode 15 made of the same material as that of the cup electrode 3. The inner electrode 15 has supports 16. Arranging the inner electrode 15 increases the area of the inner surface of the cup electrode 3. In addition, the supports 16 maintain the shape of the inner electrode 15 and increase the area of the inner surface of the cup electrode 3.

In FIGS. 10A and 10B, for example, the outer diameter d of the cup electrode 3 is 4.6 mm, the thickness t2 of the inner electrode 15 is 0.2 mm, and the thickness t3 of the outer electrode (i.e., the cup electrode 3) is 0.15 mm. In order to reduce the amount of the material of the cup electrode 3 to a small amount, it is preferred to reduce the thickness of the cup electrode 3 as much as possible. Since the outer surface of the cup electrode 3 is not often sputtered, the thickness t3 of the outer electrode is thinner than the thickness t2 of the inner electrode 15.

Since the inner electrode 15 is arranged in the cup electrode 3, both of the inner and outer surfaces of the inner electrode 15 are sputtered. Accordingly, the inner electrode 15 might be more worn out than the outer electrode by sputtering. It is therefore preferred that the thickness t2 of the inner electrode 15 be slightly thicker than the thickness t3. The number of inner electrodes 15 may be increased. For example, the cup electrode 3 may have a triple or more structure.

A cold cathode fluorescent lamp 1 according to this embodiment has such a structure that one pair of cup electrodes 3 each including the inner electrode 15, as shown in FIGS. 10A and 10B, are arranged so as to face each other at both inner ends of a glass tube 2 made of a light-transmissive insulating material, as shown in FIG. 1, and the open ends of the opposed cup electrodes 3 face a main discharge area. After being evacuated, the glass tube 2 is filled with a Neon-Argon (Ne—Ar) gas mixture, serving as an inert gas 4, and mercury. The inner surface of the glass tube 2 is coated with a fluorescent film 5. Each cup electrode 3 may be prepared by sintering a mixture containing a high melting point substance mainly comprising, for example, tungsten (W), and a low melting point substance, e.g., nickel (Ni).

Since the inner electrode 15 and the supports 16 arranged in the cup electrode 3 are easier to be sputtered than the inner surface of the cup portion, the inner electrode 15 and the supports 16 are worn out by sputtering before the inner surface of the cup portion. Consequently, the occurrence of a problem caused by wearing out the inner surface of the cup portion can be further delayed than the related art. Advantageously, the lifetime of the cold cathode fluorescent lamp 1 can be increased.

Preferably, each of the length of the inner electrode 15 and that of each support 16 is 50 percent or more of that of the cup portion so that the inner electrode 15 and the supports 16 are easier to be sputtered than the inner surface of the cup portion.

The open end of each cup electrode 3 faces the main discharge area. An inner lead 7 is welded to the back end of the cup electrode 3 such that the inner lead 7 is aligned to a welded portion of the cup electrode 3. The inner lead 7 comprises a nickel-cobalt-iron alloy having a characteristic similar to the coefficient of thermal expansion of glass. The inner lead 7 is electrically connected to the cup electrode 3 by, for example, resistance welding, arc welding, or laser welding.

The center of the inner surface of the cup electrode 3 in FIGS. 10A and 10B does not overlap the inner electrode 15. Accordingly, the inner bottom for laser welding of the cup electrode 3 is not hidden by the inner electrode 15. In the cup electrode 3 shown in FIGS. 10A and 10B, therefore, the cup electrode 3 can be welded to the inner lead 7 using a laser beam applied in the direction indicated by arrow B in FIG. 10A, thus improving the mass productivity of the cup electrodes 3. For laser welding, it is preferred that the inner diameter of the inner electrode 15 be 0.9 to 1.4 mm.

The cold cathode fluorescent lamp 1 has such a size that the thickness of the glass tube 2 ranges from 200 to 500 μm, the outer diameter thereof ranges from 1.0 to 5.0 mm, and the length thereof ranges from 50 to 1500 mm.

The present invention is not limited to the foregoing embodiments and various changes and modifications can be made without departing from the spirit and scope of the present invention.

The invention claimed is:

1. A cold cathode fluorescent lamp comprising:
   a tube having an inner surface coated with a fluorescent material; and
   tubular discharge electrodes disposed at both inner ends of the tube, wherein
   each discharge electrode has an opening facing a discharge area and includes a projection in the opening, the area of the projection being reduced by electric discharge, and
   the projections each have a columnar shape and are made of a same material as the tubular discharge electrodes.

2. The lamp according to claim 1, wherein the projection comprises a material containing tungsten.

3. The lamp according to claim 1, wherein the projection is formed by sintering tungsten.

4. The lamp according to claim 1, wherein each discharge electrode includes a plurality of projections.

5. A cold cathode fluorescent lamp comprising:
   a tube having an inner surface coated with a fluorescent film; and
   tubular discharge electrodes disposed at both inner ends of the tube, wherein
   the tubular discharge electrodes each have an opening such that the openings face each other,
   each tubular discharge electrode includes a projection in the opening so that the projection is easier to be sputtered than the inner surface of the discharge electrode, and
   the projections each have a columnar shape and are made of a same material as the tubular discharge electrodes.

6. The lamp according to claim 5, wherein the projection comprises a material containing tungsten.

7. The lamp according to claim 5, wherein the projection is formed by sintering tungsten.

8. The lamp according to claim 5, wherein each tubular discharge electrode includes a plurality of projections.

9. A liquid crystal display device comprising:
   a liquid crystal display panel including two transparent substrates having electrodes for pixel formation and a liquid crystal layer sandwiched between the substrates; and
   a backlight including at least one cold cathode fluorescent lamp that applies illumination light to the back of the liquid crystal display panel, wherein
   the cold cathode fluorescent lamp includes:
   a tube having an inner surface coated with a fluorescent film; and
   tubular discharge electrodes disposed at both inner ends of the tube, wherein
   each discharge electrode has an opening and includes a projection to be sputtered in the opening, and
   the projections each have a columnar shape and are made of a same material as the tubular discharge electrodes.

10. The device according to claim 9, wherein the projection comprises a material containing tungsten.

11. The device according to claim 9, wherein the projection is formed by sintering tungsten.

12. The device according to claim 9, wherein each discharge electrode includes a plurality of projections.

* * * * *